2,822,488

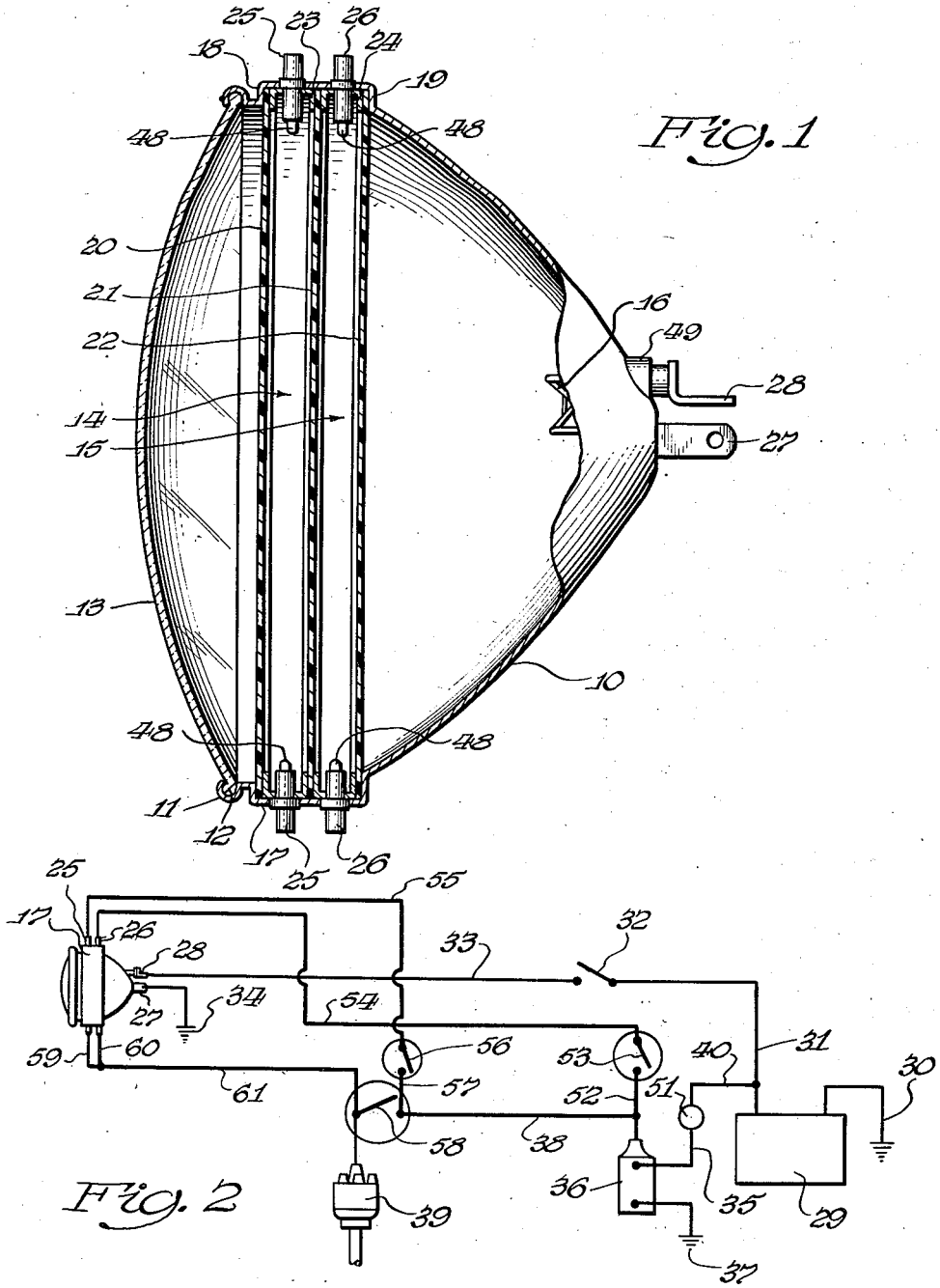

HEADLAMP CONSTRUCTION FOR AUTOMOBILES AND THE LIKE

Robert R. Citron, Stockton, Calif.

Application July 31, 1956, Serial No. 601,306

2 Claims. (Cl. 313—1)

This invention relates to lighting devices and the like; more particularly, it relates to glare-free lighting fixtures adapted for use as automobile headlamps and the like.

One of the major causes of discomfort and difficulty in driving at night is glare from the headlights of oncoming automobiles. It is well established that such glare is an important cause of numerous highway accidents. By providing a means for appreciably minimizing or reducing the glare of headlights from an approaching car, a considerable amount of comfort and safety would be provided for motorists who drive at night.

In accordance with the instant invention, I have provided a glare filter which will not appreciably reduce the power of illumination produced by unmodified automobile headlights, but which provides for the normal headlamp illumination a softened and less glaring effect. In accordance with the instant invention, it is possible to produce headlamp illumination of varying colors without substantial diminution of the original intensity or candle power of the headlamp and without the use of mechanical optical color filters interposed in the normal headlight beam.

Additionally, a further object of this invention is the provision of an automobile headlamp comprising at least one ion chamber connected in the automobile electrical system and which is interposed between the primary light source of the headlamp and the headlamp lens, whereby illumination of at least original headlamp intensity is achieved, substantially glare free.

It is another object of this invention to provide a glare-free light fixture for use in automobiles and the like, at one end of which there is a mounting for a primary light source and at the other end of which there is a lens, and having at least one sealed ion chamber under partial vacuum between the lens and the light source mounting with electrical means for illuminating said chamber by causing excitation and glowing of an excitable gas or vapor within the chamber.

Other and further objects of the invention will become apparent from the following description and appended claims, reference being had to the accompanying drawings and the numerals of reference thereon.

On the drawings:

Fig. 1 is a vertical sectional view of an automobile headlamp illustrating one embodiment of my invention.

Fig. 2 is a diagrammatic layout of one scheme of wiring that may be used in connection with the device illustrated in Fig. 1.

Referring now more particularly to the drawings, it is seen that a headlamp housing 10 is provided. The housing 10 is enlarged at its forward end and has an annular retaining flange 11 in which there is secured the annular bead 12 of a headlamp lens 13. Housing 10 has the general shape of a truncated cone.

One or more ion chambers may be provided within the housing 10 behind the lens 13. Each such ion chamber is under a partial vacuum and carries an excitable gas, vapor or other electrically excitable material, and where necessary contains a starter gas. If desired, the entire chamber formed within housing 10 may provide one enlarged ion chamber, limited or defined by said housing and the lens 13. If the latter is the case, the housing 10 is evacuated to provide a partial vacuum and an excitable composition such as a carrier or starter gas and metallic mercury or sodium or the like is provided therein.

A more versatile headlamp, having a plurality of ion chambers is more desirable than one having only a single ion chamber. That is to say, that by providing a plurality of ion chambers, each containing a different excitable composition, various light effects may be achieved. In the appended drawings, two such ion chambers 14 and 15, which are circular in cross section, are shown for the purpose of illustration. The ion chambers of which 14 and 15 are illustrative are disposed in horizontal alignment and have their longitudinal axes disposed vertically. Chambers 14 and 15 are adjacent each other; and such chambers are positioned in front of the conventional lamp filament which is the primary light source 16.

To form the ion chambers 14 and 15, in a preferred manner, an integral, annular outwardly offset ring portion 17 is formed in housing 10. Ring portion 17 provides a pair of opposed annular flanges 18 and 19. A plurality of relatively thin transparent plastic or glass walls or discs 20, 21 and 22, which extend across said ring portion 17, are secured within housing 10 in substantial parallelism. Each of the discs is spaced preferably equidistant from the adjacent thereof, said discs being horizontally spaced. The diameter of each of the discs 20, 21 and 22 is substantially equal to the diameter of the ring section 17.

Annular spacers 23 and 24, which form the outer walls of ion chambers 14 and 15 respectively, and which have opposed apertures in each thereof, are mounted in the ring section 17. The outside diameter of said spacers 23 and 24 is substantially equal to the inside diameter of said ring section 17.

The inner wall 21, which forms a common divider between chambers 14 and 15, is rigidly secured along its outer annular edge portion by spacers 23 and 24. The forward wall 20 of chamber 14 is rigidly secured in position by the spacer 23 and flange 18; and the rear wall 22 of chamber 15 is rigidly secured in position by the spacer 24 and flange 19, as illustrated in Fig. 1.

Ring section 17 has a pair of opposed apertures for each ion chamber. The apertures in said ring section 17 for each ion chamber are aligned with the apertures in the respective spacers 23 and 24. A pair of opposed fittings 25 is secured in the aligned apertures formed in the ring section 17 and spacer 23; and a pair of opposed fittings 26 is secured in the aligned apertures formed in ring section 17 and spacer 24. Each fitting 25 and 26 carries an inwardly-extending electrical terminal 48, whereby each of the chambers 14 and 15 has therein a pair of opposed terminals.

Although the particular sealing components are not shown in the drawings, it will be appreciated that each of the ion chambers 14 and 15 is hermetically sealed or gas-tight, substantially air-free and under partial vacuum; and that each of said chambers 14 and 15 has therein a requisite amount of excitable, ionizable material which, upon excitation with high-voltage electrical energy, will glow. For example, in chamber 14, one might have a trace of a starter gas, such as neon, together with a requisite amount of ionizable metallic mercury, and in chamber 15, a starter gas and sodium could be provided, or, if desired, neon gas alone could be provided in one of the chambers. Accordingly, a high voltage charge of electricity sent across the space, from one electrode to the other, in each ion chamber, will cause the excitable material in the charged chamber to glow and emit its predominant color.

The light source 16 is mounted in a suitable socket or fitting 49 secured in the back of housing 10, as illustrated to the right of Fig. 1. The socket 49 is connected to a pair of terminal components 27 and 28 which extend outwardly from housing 10.

For the operation of the device, one preferred scheme of wiring which is connected into a conventional automobile wiring system is illustrated in Fig. 2. Therein a battery 29, such as a conventional automobile battery, is shown having a connection or lead 30 to ground. From the opposite pole of the battery 29, a wire 31 connects with the headlight switch 32, the operating component of which may be suitably mounted in the dashboard (not shown). Upon closing of switch 32, wire 33 is energized and a circuit to ground at 34 is established to cause the primary light source 16 to become illuminated.

A lead 50 off or connected to the wire 31 connects the conventional distributor cap 51 with battery 29. A lead or wire 35 off distributor cap 51 energizes a conventional automobile coil 36, or the equivalent thereof, which is grounded as illustrated at 37.

A high voltage wire 52 leads out of the coil 36 and is electrically connected to one terminal of an ion chamber switch 53. A wire 54 connects the other terminal of said switch 53 with the upper terminal 26 of ion chamber 15. The upper terminal 25 of the ion chamber 14 is energized by a wire 55 which terminates at switch 56. A short wire 57 extends from the other terminal of switch 56 and is secured to one terminal of a switch 58 where said wire 57 connects with and is energized by voltage wire 38.

A pair of return wires 59 and 60 from the lower terminals of the ion chamber 14 and 15 are connected together into a high voltage return 61 which is connected to the other terminal of switch 58. The wire 61 extends from the switch 58 to the distributor 39.

By opening the switch 58, high voltage energy is routed from the high voltage wire 52 through such of ion chamber switches 53 and 56 as are closed to their respective ion chambers 15 and 14. From such energized ion chambers, the high voltage circuit is completed through distributor 39, to spark plugs (not shown) and ground (not shown). Accordingly, it is apparent that the ion chambers may be operated individually or together.

For normal daytime driving, the switches 53 and 56 are retained in open position and the switch 58 is closed. Accordingly, the high voltage energy from coil 36 is carried directly across switch 58 to the distributor 39 and thence to the spark plugs (not shown) and ground (not shown) in a conventional manner. In the event light only from the primary source is desired, switches 32 and 58 are closed while switches 53 and 56 are open.

Inasmuch as the gas or vapor in the respective ion chambers is of exceedingly low concentration, absorption of or reduction in light energy from the primary light source 16 will not be appreciable as it passes through and out of said ion chambers. Practically, when light energy from source 16 is passed through a charged ion chamber, there will be substantially no effective power loss due to absorption because of the addition of energy from the charged chamber. In addition, such emitted light will be glare-free.

If the headlamp herein described is employed in an automobile, for example, the manual components (not shown) for operation of the switches 53, 56 and 58 may be mounted on the dashboard of the automobile.

The wiring diagram described is only one of a plurality of wiring arrangements that could be employed. Others, employing the existing structure in a vehicle such as an automobile, will be apparent.

In addition to cutting down glare because of the softening effect produced by passage of the light from the primary source 16 through either of the charged ion chambers, other desirable effects can be created. For example, by employing sodium vapor in one of the chambers to produce a sodium vapor light, excellent lighting for fogs can be obtained because of the penetrating effect of the resulting yellow light.

As many changes or substitutions could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A headlamp construction for automobiles and the like, comprising a reflector housing, primary light source means, including a filament mounted in one end of said reflector, a lens secured in the opposite end of said housing and means forming an ion chamber extending transversely entirely across the reflector housing and being disposed in a medial plane in the path of and intersecting substantially all of the rays emitted from said filament, said ion chamber forming means being between said filament and said lens.

2. A headlamp construction for automobiles and the like, comprising a reflector housing; primary light source means including a filament mounted in one end of said reflector; a lens secured in the opposite end of said reflector; a plurality of parallel transparent discs forming a plurality of ion chambers therebetween, said discs being secured within said housing and being disposed in transverse medial planes between the primary light source means and said lens, said discs extending substantially entirely across the space within said housing and intersecting substantially all rays emitted from said filament; an electrically excitable gas in said chambers, and circuit means operably connected to the battery of the vehicle and controlling independent and simultaneous illumination of said primary light source and said ion chambers.

References Cited in the file of this patent
UNITED STATES PATENTS

| | | |
|---|---|---|
| 1,602,245 | Nisbet | Oct. 5, 1926 |
| 1,950,445 | Braselton | Mar. 13, 1934 |
| 2,209,052 | Corlburg | July 23, 1940 |